United States Patent [19]

Schweizer

[11] Patent Number: 4,977,955

[45] Date of Patent: Dec. 18, 1990

[54] HEAT-TRANSFER WALL COMPOSED OF TWO PLATE-LIKE PARTS

[75] Inventor: Sandro Schweizer, Wiesendangen, Switzerland

[73] Assignee: Sulzer Brothers Limited, Winterthur, Switzerland

[21] Appl. No.: 346,944

[22] PCT Filed: Jul. 28, 1988

[86] PCT No.: PCT/EP88/00683

§ 371 Date: Mar. 30, 1989

§ 102(e) Date: Mar. 30, 1989

[87] PCT Pub. No.: WO89/01122

PCT Pub. Date: Feb. 9, 1989

[30] Foreign Application Priority Data

Aug. 4, 1987 [CH] Switzerland .................. 2987/87

[51] Int. Cl.[5] ............................................. F28F 3/12
[52] U.S. Cl. .................................... 165/170; 165/168; 122/6 A
[58] Field of Search ............................. 165/168–170; 122/6 A

[56] References Cited

U.S. PATENT DOCUMENTS 2,440,245  4/1948  Chevigny .................. 165/169 X

FOREIGN PATENT DOCUMENTS 730114  12/1940  Fed. Rep. of Germany ...... 165/169
1764351  7/1971  Fed. Rep. of Germany .
2346155  4/1975  Fed. Rep. of Germany ...... 165/169
2703672  8/1978  Fed. Rep. of Germany ...... 165/168
0769929  3/1957  United Kingdom .
0826625  1/1960  United Kingdom .

Primary Examiner—Martin P. Schwadron
Assistant Examiner—Allen J. Flanigan
Attorney, Agent, or Firm—Kenyon & Kenyon

[57] ABSTRACT

A wall (100) serves to separate two rooms (200,300) at different temperatures and has a plurality of essentially parallel tubular sections (11) which conduct a fluid medium, said sections being enclosed between two plate-like parts (2,3) and connected in a heat-conducting manner to at least one of the said parts. The two plate-like parts (2,3) are rigidly interconnected along an interface (50) essentially parallel to the two principal directions of the wall (100). The interface (50) is arranged so as to lie outside the external contour of the tubular sections 11). The plate-like part (3) containing the tubular sections faces the room (300) at the higher temperature.

13 Claims, 1 Drawing Sheet

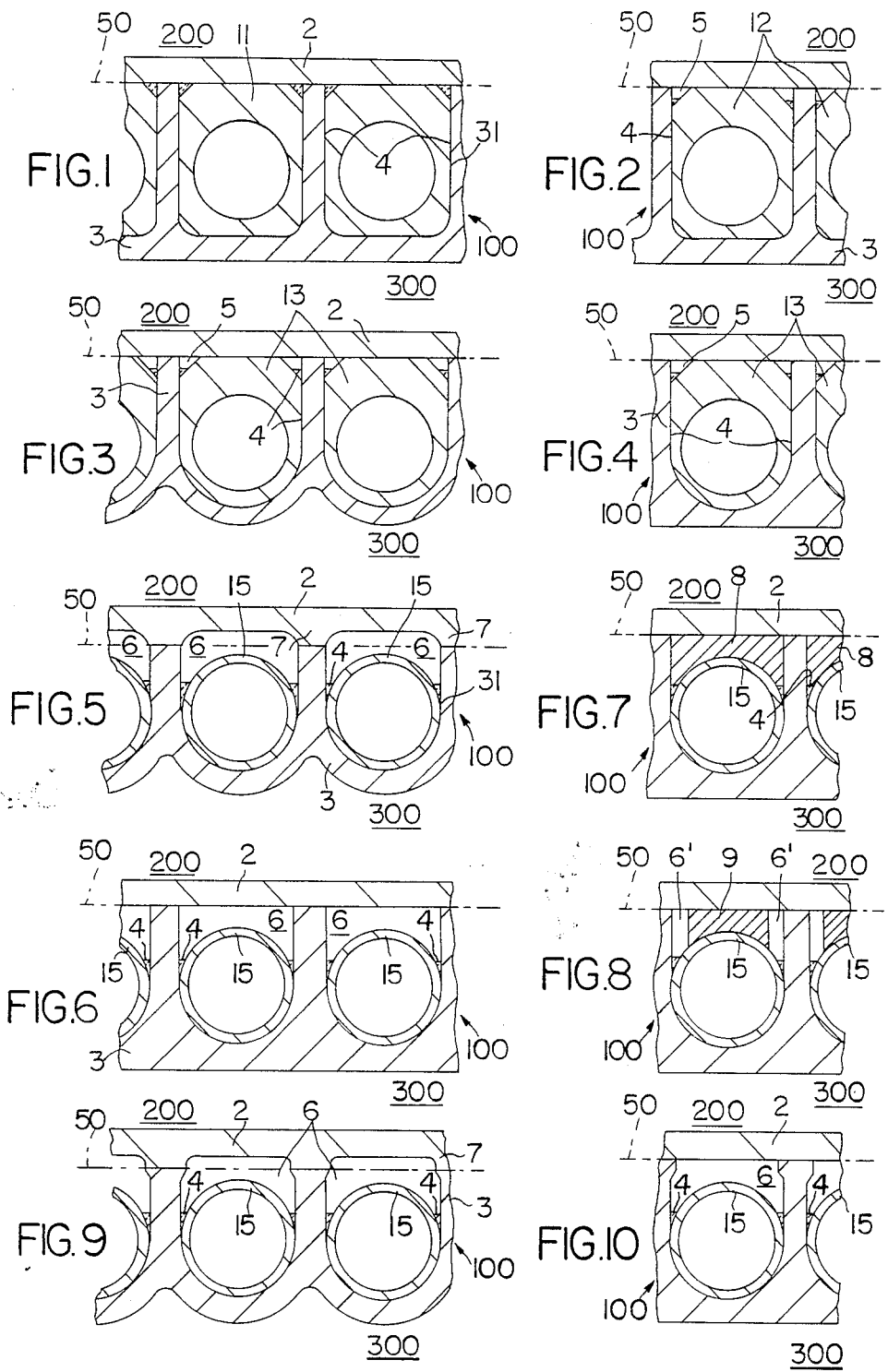

HEAT-TRANSFER WALL COMPOSED OF TWO PLATE-LIKE PARTS

The invention relates to a heat-transfer wall composed of two plate-like parts for separating two rooms at different temperatures, having several tubular sections substantially parallel to each other, enclosed between the plate-like parts and being in heat conducting connection with at least one part, which tubular sections carry a streaming medium, the two plate-like parts being firmly connected together along an interface which extends substantially parallel to the two principal directions of the wall.

Such a wall is known wherein the tubular sections have a circular cross section, so that for reasons of assembly the interface between the plate-like parts lies in the region of the plane in which also the longitudinal axes of the tubular sections extend. The tubular sections, therefore, each have half their cross section lying in respective channel-like cutouts of the two plate-like parts. As the cutouts of both wall parts must fit together exactly and must be arranged around the tubular sections so as to match, the precision requirements for making such a wall as well as the costs are quite high.

It is the object of the invention to improve a heat-transfer wall of the initially mentioned kind so that it can be made at considerably lower cost for equally good performance.

According to the invention, this problem is solved in that the interface between the plate-like parts is arranged so that it lies outside the outer contour of the tubular sections and that the plate-like part containing the tubular sections faces the room at the higher temperature. This solution is based on the finding that because of the different temperatures in the rooms separated by the wall the heat conduction through the wall can be associated in large part with one of the two plate-like wall parts. The other wall part then serves primarily as covering and/or reinforcing element. This obviates channel-like cutouts for receiving tubular sections in the plate-like wall part which faces the room at the low temperature. Hence also the necessity is eliminated to fit together exactly cutouts in both wall parts and around the tubular sections. In the new wall, therefore, the cost of adapting is considerably reduced. Also assembly of the new wall is much simpler, damage to the tubular sections during the bringing together of the two wall parts being practically ruled out. Of advantage is also that the tubular sections can be secured in one wall part only and can then be handled together with it as a structural unit.

Avoiding damage to the tubular sections during assembly is especially important when the wall is to be installed under difficult operating conditions. This is the case for example when high pressures and temperatures act on the wall simultaneously, possibly combined further with stress from radiactive radiation.

Some embodiment examples of the invention will be explained more specifically in the following description with reference to the drawings, which in FIGS. 1 to 10 show each a partial transverse section of a wall according to the invention.

According to FIG. 1, a metallic, flat, heat-transferring wall 100 separates a hot room 300 from a cooler room 200. The wall 100 consists of two plate-like parts 2 and 3 and of straight tubular sections 11 enclosed between them. The tubular sections are parallel and are traversed by a cooling medium, e.g. water, which has on the average about the same temperature as the cooler room 200. The other contour of the tubular sections 11 is rectangular. Each tubular section is embedded in a channel-like cutout 31 of the wall part 3. Approximately three fourths of the outer circumference of each tubular section 11 are in heat-conducting contact with the periphery of the respective cutout 31. The corners of the cutouts are rounded, and the corners of the tubular sections 11 associated with them are adapted accordingly, so that good heat flow takes place between the thicker wall part 3 and the tubular sections. The tubular sections 11 are secured in the cutouts 31 by means of solder material 4. The thinner wall part 2, which is formed like a sheetmetal plate, is connected gas-tight with the thicker wall part 3 along a planar interface 50. Approximately one fourth of the outer surface of each tubular section 11 extends along the interface 50 and touches the part 2 when the wall is in the assembled state. Thus, the interface 50 is disposed outside the outer contour of the tubular sections 11 and does not intersect with the plane of the tubular section. The clear cross section of the tubular sections is circular and shifted with respect to the total cross section of each tubular section from the center toward the hotter room 300.

To produce a wall according to FIG. 1, the tubular sections 11 together with a solder foil for each as intermediate layer are inserted in the cutouts 31 of the thicker wall part 3; the tubular sections are soldered to part 3 by heating, thereby creating the heat-conducting connection. Thereafter the planes of the two parts 2 and 3 facing each other as well as the still free surfaces of the tubular sections 11 are machined to ensure a satisfactory, smooth abutting of the parts along the interface 50. Subsequently the thinner wall part 2 is sealingly connected with the thicker wall part 3 along the interface, e.g. by hard soldering, diffusion soldering or welding or by explosion plating. Owing to this manufacturing process, each tubular section 11 touches also the part 2, so that the entire circumference of each tubular section participates in the good heat flow in the wall 100.

The form of realization according to FIG. 2 differs from that according to FIG. 1 only in that the externally rectangular tubular sections 12 are beveled relatively much at the edges facing the thinner wall part 2, so that grooves 5 form. Into these grooves solder material, e.g. in the form of wires, is inserted, which can move up during the soldering in of the tubular sections 11. The grooves 5 may be made so large that after completion of the wall 100 continuous channels 5 remain free, which can serve for control and possibly removal of leaks.

In the embodiments according to FIG. 3 and 4, tubular sections 13 are provided, in which the side toward the thinner wall part 2 is rectangular while the side away from part 2 is semicircular, whereby—with the cutout adapted accordingly—a stabilization of the heat flow and of the mechanical stresses is achieved. According to FIG. 3, the plane of part 3 bordering on room 300 is adapted to the semicircular contour of the tubular sections, so that part 3 has essentially a constant wall thickness. In the example according to FIG. 4, the tubular sections 13 and the cutouts have the same contour as in FIG. 3, but the plane of part 3 toward room 300 is flat rather than being corrugated.

In the embodiment examples according to FIGS. 5 to 10, normal circular tubes 15 are used. The variants per FIGS. 5, 6, 9 and 10 are usable for relatively small heat quantities. Here a free space 6 remains between the tubes 15 and the thinner wall part 2 which—similar to the grooves or small channels 5 in FIGS. 2, 3 and 4—can serve for control and possibly for the removal of leaks.

In the case of the walls according to FIGS. 5 and 9, the thicker wall part 3 is of the same design with respect to its plane toward room 300 as in the example according to FIG. 3. However, the thinner wall parts 2 have ribs 7 which are each aligned with a web between two adjacent cutouts and join with these webs along the interface 50. The interface is disposed between the two wall parts 2 and 3 in a region of lower mechanical load.

In FIGS. 9 and 10, the webs are widened in flange fashion in the region of the interface 50, so that there exists a sufficiently large connecting area between parts 2 and 3 despite a thin-walled construction.

The embodiments according to FIGS. 7 and 8 are in principle of the same structural design as in FIG. 6, but in space 6 filling material in the form of sectional rods 8 and 9 is arranged; they are soldered in between the tubes 15 and the thinner wall part 2. In FIG. 7, each section 8 fills the entire interspace, whereas in FIG. 8 narrow spaces 6' remain free on either side of the sectional rod 9; they serve for control and possibly removal of leaks.

Although all examples relate to a flat wall with parallel, straight tubular sections, the wall may alternatively have a curved form, with the parallel tubes either following the curvature or extending in parallel arrangement crosswise to the curvature. The interface between the two parts 2 and 3 then also follows the curvature. Generally the tubular sections are connected in parallel with respect to the coolant stream; but a connection in series is also possible.

The wall according to the invention can be applied in various technical areas, e.g. for chemical reactors, in nuclear plants, or in low temperature engineering. For the forms of realization according to FIGS. 7 and 8, it is possible to connect the tubes with the surrounding wall parts by explosion welding or hydraulic reaming.

What is claimed:

1. A heat transfer wall comprising
   a first plate-like heat conductive part having a plurality of parallel webs defining a plurality of parallel cutouts therebetween;
   a plurality of parallel tubes for conducting a coolant therethrough; each said tube being disposed within a respective cutout in heat-conductive contact with said first part; and
   a second plate-like heat conductive part secured to said first part along an interface disposed outside an outer contour of said tubes.

2. A heat transfer wall as set forth in claim 1 wherein said first part is thicker than said second part.

3. A heat transfer wall as set forth in claim 1 wherein each said cutout of said first part is of rectangular cross-section and each tube has an outer rectangular cross-section shape.

4. A heat transfer wall as set forth in claim 1 wherein each said first part has a semi-circular corrugated outer face and is of constant wall thickness and each tube has a semi-circular side facing said first part.

5. A heat transfer wall as set forth in claim 1 wherein each tube is cylindrical and is spaced from said second part.

6. A heat transfer wall as set forth in claim 5 wherein said second part has a plurality of parallel ribs extending toward said first part and secured to said webs along said interface.

7. A heat transfer wall as set forth in claim 6 wherein each web has a flange thereon at said interface.

8. A heat transfer wall as set forth in claim 5 which further includes a filler between each tube and said second part.

9. A heat transfer wall as set forth in claim 1 which further includes s soldered connection between each tube and said first part.

10. A heat transfer wall as set forth in claim 1 wherein each tube has a part of rectangular cross-section facing said second part and a part of a semi-circular shape facing and mating with said first part.

11. A heat transfer wall as set forth in claim 10 wherein each tube defined a tubular flow passage being disposed closer to said first part than said second part.

12. A heat transfer wall as set forth in claim 1 wherein said second part abuts said parallel tubes.

13. A heat transfer wall as set forth in claim 1 wherein said first and second parts are explosively welded together.

* * * * *

UNITED STATES PATENT AND TRADEMARK OFFICE
CERTIFICATE OF CORRECTION

PATENT NO. : 4,977,955

DATED : December 18, 1990

INVENTOR(S) : SANDRO SCHWEIZER

It is certified that error appears in the above-identified patent and that said Letters Patent is hereby corrected as shown below:

```
In the Abstract, line 11 change "sections 11)." to
     -sections (11).-
Column 4, line 34 change "s" to -a-
Column 4, line 41 change "defined" to -defines-
```

Signed and Sealed this

Eighteenth Day of August, 1992

*Attest:*

DOUGLAS B. COMER

*Attesting Officer*  *Acting Commissioner of Patents and Trademarks*